US008780138B2

(12) United States Patent  (10) Patent No.: US 8,780,138 B2
Laine et al.  (45) Date of Patent: Jul. 15, 2014

(54) INFORMATION PRESENTATION BASED ON DISPLAY SCREEN ORIENTATION

(71) Applicant: Nokia Corporation, Espoo (FI)

(72) Inventors: Kari Petri Tapio Laine, Oulu (FI); Janne Petteri Sipila, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/951,189

(22) Filed: Jul. 25, 2013

(65) Prior Publication Data

US 2014/0009500 A1    Jan. 9, 2014

Related U.S. Application Data

(60) Division of application No. 13/544,545, filed on Jul. 9, 2012, now Pat. No. 8,531,486, which is a continuation of application No. 12/031,344, filed on Feb. 14, 2008, now Pat. No. 8,217,964.

(51) Int. Cl.
*G09G 5/00* (2006.01)

(52) U.S. Cl.
USPC .......................................................... 345/659

(58) Field of Classification Search
None
See application file for complete search history.

(56) References Cited

U.S. PATENT DOCUMENTS

| | | | | |
|---|---|---|---|---|
| 6,412,110 | B1* | 6/2002 | Schein et al. | 725/40 |
| 8,140,059 | B2* | 3/2012 | Okuda et al. | 455/414.4 |
| 2008/0074443 | A1* | 3/2008 | Taniguchi et al. | 345/659 |

FOREIGN PATENT DOCUMENTS

| | | |
|---|---|---|
| EP | 1 686 445 A2 | 8/2006 |
| EP | 1 862 921 A1 | 12/2007 |
| JP | H09-297738 A | 11/1997 |
| JP | 10-254614 A | 9/1998 |
| JP | H11-164201 A | 6/1999 |
| JP | H11-284927 A | 10/1999 |
| JP | 2000-098990 A | 4/2000 |
| JP | 2001-242845 A | 9/2001 |
| JP | 2004-015367 A | 1/2004 |
| JP | 2005-130133 A | 5/2005 |
| JP | 2005-156627 A | 6/2005 |
| JP | 2005-234137 A | 9/2005 |
| JP | 2006-211394 A | 8/2006 |
| JP | 2006-230566 A | 9/2006 |
| JP | 2007-142762 A | 6/2007 |
| JP | 2007-518155 A | 7/2007 |
| JP | 2007-280029 A | 10/2007 |
| JP | 2007-323637 A | 12/2007 |
| JP | 2008-181133 A | 8/2008 |
| WO | 2005/052777 A2 | 6/2005 |
| WO | 2006/123513 A1 | 11/2006 |
| WO | 2007/007166 A2 | 1/2007 |
| WO | 2008/033853 A2 | 3/2008 |

OTHER PUBLICATIONS

Office Action for corresponding Japanese Patent Application No. 2010-544744, dated Sep. 12, 2013, 8 pages (English Language Summary Included).

(Continued)

*Primary Examiner* — Ryan R Yang
(74) *Attorney, Agent, or Firm* — Ditthavong & Steiner, P.C.

(57) ABSTRACT

A handheld devise presents information on a display screen in alternate formats. The device determines its orientation relative to a device user and selects a format based on that orientation. The displayed information may also be scrolled or zoomed based on a detected motion of the device.

20 Claims, 8 Drawing Sheets

(56) References Cited

OTHER PUBLICATIONS

Manual for Cell Phone W51CA, published Jan. 2007, retrieved from web page http://web.archive.org/web/20070308152158/http://www.au.kddi.com/torisetsu/pdf/w51ca/w51ca_torisetsu.pdf, p. 268.

Notification of ground of rejection for corresponding JP Patent Application No. 2010-544744, dated Jan. 21, 2014, 11 pages.

Office Action for corresponding Chinese Application No. 200980105229.9 issued Nov. 4, 2013 (English Summary of Office Action Included) (previously submitted Dec. 20, 2013).

Office Action for corresponding Chinese Application No. 200980105229.9 issued Nov. 4, 2013 (English Summary of Office Action Included).

Japanese Office Action with partial English translation for related application No. 2013-117547, dated Apr. 14, 2014, 9 pages.

Chinese Office Action with English language summary for related application No. 200980105229.9, dated Apr. 25, 2014, 5 pages.

Rejection Decision by Board of Appeal for corresponding Japanese Application No. 2010-544744, dated May 21, 2014, with English language summary, 14 pages.

* cited by examiner

INFORMATION PRESENTATION BASED ON DISPLAY SCREEN ORIENTATION

CROSS REFERENCE TO RELATED APPLICATION

This Application is a divisional of U.S. application Ser. No. 13/544,545 filed Jul. 9, 2012, which is a continuation of the U.S. application Ser. No. 12/031,344 filed Feb. 14, 2008. The entirety of which is incorporated herein by reference.

FIELD

This description generally relates to electronic devices that include a display for presenting information to a user, and wherein the presented information is modified based on an orientation or motion associated with the device.

BACKGROUND

Many electronic devices are generally constrained with respect to the manner in which they may be used to display information. For example, device screens are configured and shaped so that it may be more advantageous to format displayed information in one format in comparison to another. By way of illustration, a person may use an Electronic Service Guide (ESG) (also called an Electronic Program Guide (EPG) or Interactive Program Guide (IPG)) when watching television to determine what programs are currently being broadcast (or will be broadcast) on one or more television channels. One type of ESG is known as a Horizontal Service Guide (HSG). An HSG displays a matrix of multiple channels and multiple programs and enables a user to obtain an overall sense of what programs are currently being shown (and/or will be shown) on multiple channels. In general, an HSG is better suited for rectangular display screens having a landscape orientation relative to the user. Another type of ESG is known as a Vertical Service Guide (VSG). A VSG typically displays a list of programs scheduled for a particular channel in a particular time range. VSGs are often better suited for rectangular display screens in a portrait orientation relative to the user.

Often, a given device is configured to only show information in one of an HSG format or a VSG format. If the format can be changed, explicit commands from the user (e.g., in the form of command to change a device setting) may be needed. The usually presents no concerns for devices in which the orientation of a display screen relative to a user will generally remain the same (e.g., a television or desktop computer). For other types of devices (e.g., handheld devices), however, the display screen orientation relative to the user may frequently change. In such cases, requiring a user to change the device settings in order to change the format of displayed information can cause significant user inconvenience.

BRIEF SUMMARY

The following presents a simplified summary of aspects of certain embodiments. This summary is not an extensive overview, and is not intended to identify key or critical elements or to delineate the scope of the claims.

In some embodiments, a portable electronic device has a display screen and is configured to display information in a first format when the device is generally in a first orientation relative to the user. The device is further configured to display information in a second format when the device is generally in a second orientation relative to the user. The device automatically changes from one display format to another based on the physical orientation of the device. Device orientation in some embodiments is detected via one or more sensors, e.g., accelerometers, motion sensors, gravity-based orientation sensors, or other orientation sensing components. In other embodiments, orientation may be detected via a position of a user's hand on one or more elements of the device. In still other embodiments, a hardware switch may be activated by, e.g., a slider or a hinge.

In certain embodiments, an electronic device displays a horizontal service guide (HSG) when the device is in a landscape orientation and a vertical service guide (VSG) when in a portrait orientation. In other embodiments, particularly when the device is configured with a square display screen (e.g., when a landscape orientation and portrait orientation are equivalent with respect to display screen dimensions), a change in the orientation of the device may cause a change from a first display format (e.g., an HSG) to a second display format (e.g. a VSG).

In still other embodiments, a device is configured to scroll, pan or zoom a VSG, an HSG or other type of display format based on a manner in which a user moves the device.

BRIEF DESCRIPTION OF THE DRAWINGS

The foregoing summary and the following detailed description are better understood when read in conjunction with the accompanying drawings, which are included by way of example, and not by way of limitation. In the drawings, like reference numbers indicate like features.

DETAILED DESCRIPTION

In the following description of various embodiments, reference is made to the accompanying drawings, which form a part hereof, and in which is shown by way of illustration various embodiments and associated features. It is to be understood that other embodiments may be utilized and structural and functional modifications may be made.

Figure 1:
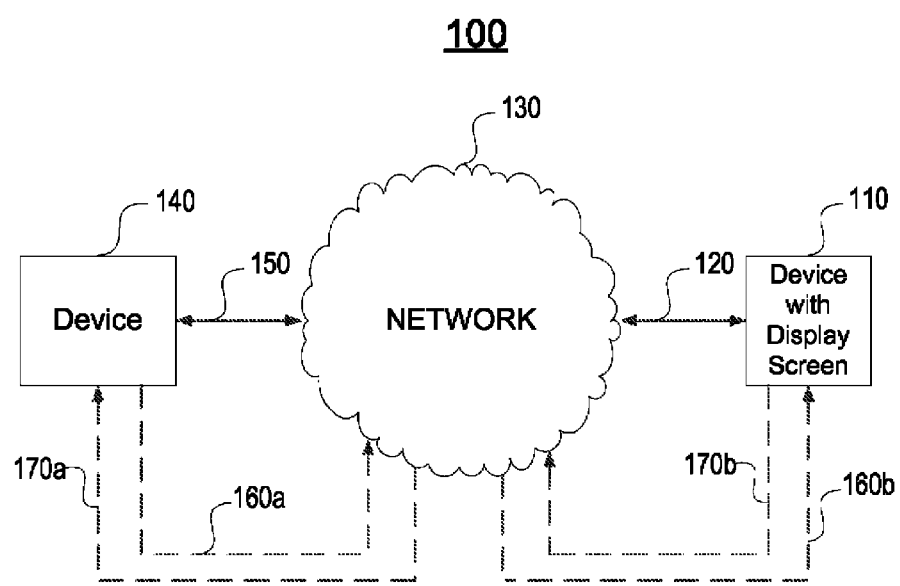
FIG. 1 illustrates a network communication environment in which devices are operated and methods performed according to some embodiments.

FIG. 1 is a diagram of a network communication environment 100 in which devices according to some embodiments are operated, and in which methods according to some embodiments are performed. A first device 110 includes a display screen (as discussed in more detail below) and is connected to a network 130 via a connection 120. Network 130 may include the Internet, an intranet, wired or wireless networks, packet networks, television (TV) or radio broadcasting networks, or any other network or combination of a number of networks suitable for facilitating broadcasting, multicasting, and/or unicasting communication between platforms in general. In some embodiments, one or more unidirectional broadcast networks are included as part of network 130, such as a digital video broadcasting-terrestrial (DVB-T) network, a digital video broadcasting-handheld (DVB-H) network, an analog television (TV) network, or the like. Also shown in FIG. 1 is a second device/system 140 connected to network 130 via a connection 150. Device/system 140 may be another device (similar to device 110) having a display screen. Device/system 140 may also be a server, a data carousel, a storage, a broadcasting transmitter, or any combination of the aforementioned, may be another network element, etc. By virtue of the connectivity shown, devices 110 and 140 communicate with one another. Such communications enable the exchange of various types of information. For example, the communications may include program listings, audio/video files, other multimedia files, video streams, analog or digital television (TV) broadcasts, and the like. The communications may further include additional information such as control information.

The actual connections represented by connections 120 and 150 may be embodied in various forms. For example, connections 120 and 150 may be hardwired/wireline connections. Alternatively, connections 120 and 150 may be wireless connections. Connections 120 and 150 are shown in FIG. 1 as supporting bi-directional communications (via the dual arrow heads on each of connections 120 and 150). Alternatively, or additionally, communication environment 100 may be structured to support dissimilar forward (160a and 170b) and reverse (170a and 160b) channel connections (e.g., use of one media for communication in one direction and use of a different media for communication in a different direction).

Communication environment 100 may be part of a larger network consisting of additional devices. For example, device/system 140 may exchange communications with a plurality of other devices/systems (not shown) in addition to device 110. The communications may be conducted using one or more communication protocols. Furthermore, communication environment 100 may include one or more intermediary nodes (not shown) that may forward, buffer, store, route, or otherwise process communications between the various devices.

Figure 2:
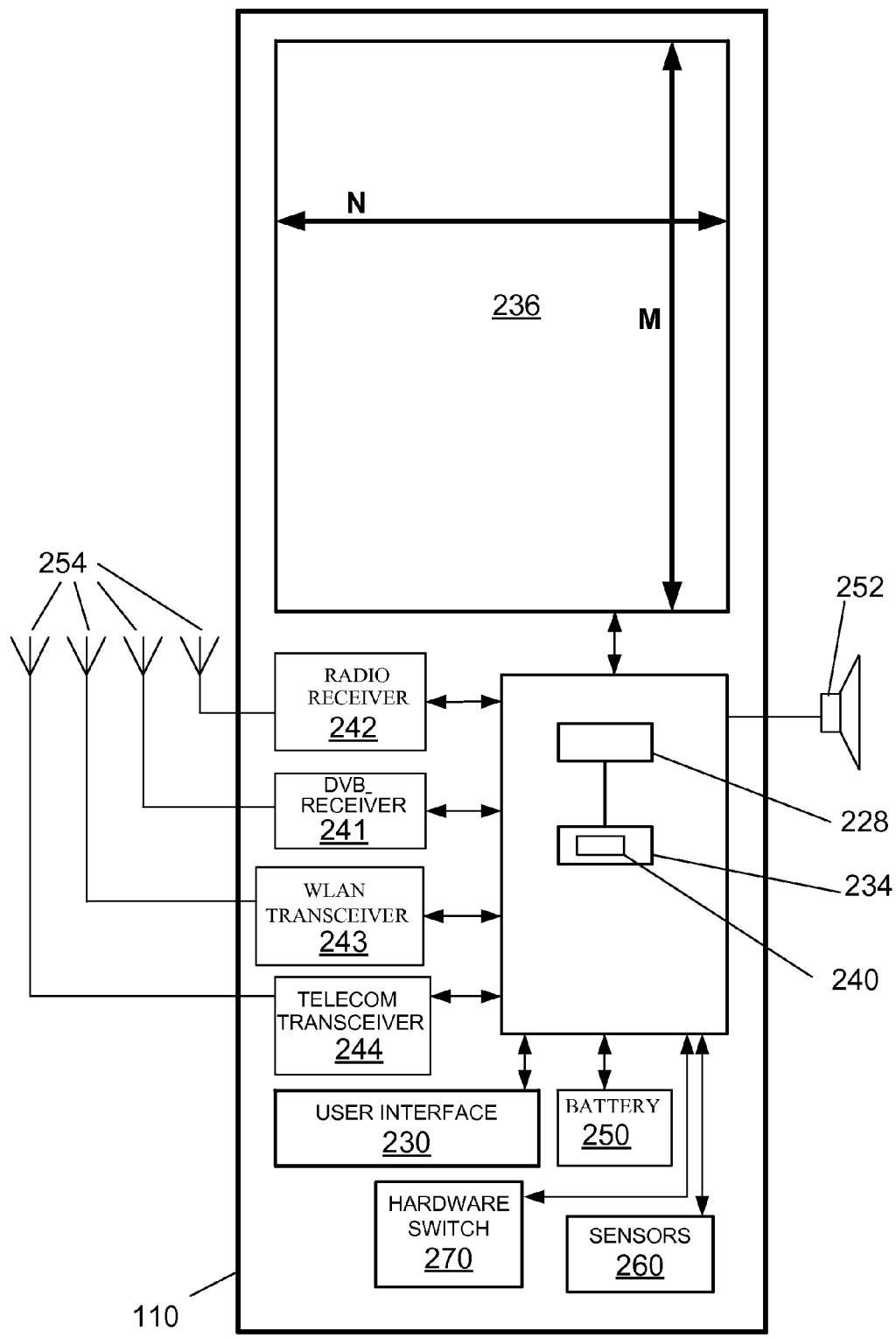
FIG. 2 is a block diagram of a device according to some embodiments.

FIG. 2, describing one embodiment, is a block diagram of device 110. Device 110 could be any of various types of portable electronic devices (e.g., a laptop computer, a notebook computer, some other type of portable computing device, a personal digital assistant, a smart phone, a mobile telephone, a mobile communication device, a television/radio device, a camera/camcorder device, an audio/video player, a positioning device, etc., or any combination thereof). All of the components shown in FIG. 2 need not be present in all embodiments. Although various components of device 110 are represented as a single block, device 110 may include more than one of a particular component represented by a given block in FIG. 2. As shown in FIG. 2, device 110 includes a processor 228 connected to a user interface 230, a memory 234 and/or other storage, and a display screen 236. In the embodiment of FIG. 2, a portion of display screen 236 on which information can be shown has dimensions M×N, where typically M>N. In some embodiments, M=N (e.g., display screen 236, or the portion of display screen 236 that shows information, is in the shape of a square). As generally used throughout this description, device 110 is in a "landscape" orientation relative to a user if the M dimension is generally parallel to a line connecting the user's eyes and in a "portrait" orientation if the N dimension is generally parallel to the line connecting the user's eyes.

Device 110 also includes a battery 250, a speaker 252, antennas 254 and one or more sensors 260. In some embodiments, the one or more sensors 260 are used to detect a motion associated with device 110 and/or display screen 236 as more fully set out below. Additionally, in some embodiments, the one or more sensors 260 are arranged as part of an integrated circuit that may include a separate processor (not shown), or may incorporate processor 228. User interface 230 may further include a keypad, touch screen, voice interface, four arrow keys, joy-stick, stylus, data glove, mouse, roller ball, touch screen, or the like. In addition, user interface 230 may include the entirety of or portion of display screen 236.

Executable instructions and data used by processor 228 and other components within device 110 are (in some embodiments) stored in a machine-readable memory 234. Memory 234 may be implemented with any combination of read only memory modules or random access memory modules, optionally including both volatile and nonvolatile memory. Software 240 may be stored within memory 234 (and/or other storage within device 110) to provide instructions to processor 228 for enabling device 110 to perform various functions described herein, including determining an appropriate display format for presenting information on display screen 236 based on outputs of one or more of sensors 260, generating the appropriate display format, etc. Alternatively, some or all of the executable instructions may be embodied in hardware or firmware (not shown). For example, the executable instructions may be embodied in one or more application-specific integrated circuits (ASICs), field programmable gate array (FPGAs), or the like. One of skill in the art will appreciate that ASICs, FPGAs and the like may include logic circuits, and that the logic circuits may be configured using one or more programmable files, fuse maps, or the like.

Device 110 includes additional hardware, software and/or firmware to support one or more aspects of certain embodiments as described herein. For example, device 110 may include additional audiovisual support software, hardware and firmware. Device 110 may be configured to receive, decode and process digital broadband broadcast transmissions that are based, for example, on the Digital Video Broadcast (DVB) standard, such as DVB-H, DVB-T or DVB-MHP, through a specific DVB receiver 241. Device 110 may also be provided with other types of receivers for digital broadband broadcast transmissions. Additionally, device 110 may also be configured to receive, decode and process transmissions through FM/AM Radio receiver 242, WLAN transceiver 243, and telecommunications transceiver 244. In at least one embodiment of the invention, device 110 may receive radio data stream (RDS) messages. Additional formats and protocols may be used to convey information, data, messages and the like.

Some embodiments include a machine-readable media holding instructions that, when executed (e.g., by one or more processors within device 110), cause a device to perform various operations as described herein. For example, product implementations may include a series of instructions fixed on a tangible storage medium (e.g., a diskette, CD-ROM, ROM, DVD, fixed disk, thumb drive, etc.) or transmittable to device 110 (e.g., via a modem or other interface). Such transmissions may be over a tangible medium (e.g., optical or analog communication lines) or implemented wirelessly (e.g., microwave, infrared, or other transmission techniques). The series of instructions may embody all or part of the functionality with respect to a system (e.g., network communication environment 100 of FIG. 1), or device (e.g., device 110), and can be written in a number of programming languages for use with many different computer architectures and/or operating systems, as would be readily appreciated by one of ordinary skill. Various embodiments of the invention may also be implemented as hardware, firmware or a combination of software, hardware and/or firmware.

As shown in FIG. 2 and indicated above, device 110 includes one or more sensors 260 to detect orientation and/or movement of device 110 and/or display screen 236. Because the locations and orientations of sensors 260 within device 110 are fixed and known, output from those sensors can be used to determine the orientation of device 110 and/or when device 110 has been rotated and/or translated. For example, sensors 260 may include an accelerometer that may be used to measure acceleration forces, times and/or directions (e.g., vector quantities). In some embodiments, one or more of sensors 260 measures a gravity vector (relative to device 110), with that vector used to determine an angle at which device 110 is tilted with respect to the earth. Other types of orientation and/or motion sensors can be employed. For example, sensors 260 may include one or more magnetometers to determine the direction of the earth's geomagnetic vector. Orientation sensors may also be configured to detect a magnitude of rotational and/or translational motion. For example, and as described below in connection with FIG. 5, output from sensors 260 quantifying translational and/or rotational motion can be used to scroll, zoom or pan information presented on display screen 236. Alternatively, the one or more orientation and/or motion sensors may include gyroscopes. Additionally, any type of motion sensor may be implemented on device 110, as part of an integrated circuit and/or included in sensors 260.

Still other types of sensors may be used. The input to the sensors and the outputs from the sensors may also be subjected to one or more filtering (e.g., smoothing) algorithms (not shown in FIG. 2) to filter out noisy sensor measurements.

In some embodiments, one or more sensors are used to determine where a user has placed her hands relative to the form factor associated with device 110. From this determination, it is then possible to infer the manner in which device 110 is being held by a user, and hence, the orientation of device 110 relative to the user. For example, one or more capacitive sensors may be located on regions of device 110 that are likely to be grasped by a user when holding device 110 in a portrait orientation. A different set of capacitive sensors are then located in regions of the device likely to be grasped by a user when holding device 110 in a landscape orientation. Based on output from those capacitive sensors, one or more processors in device 110 infers the manner in which the user is holding the device and thus the orientation of the device.

In some embodiments, as shown in FIG. 2, a hardware switch 270 is included in the form factor of device 110. Hardware switch 270 may also be integrated with, or integrate, one or more of sensors 260. An output of hardware switch 270 may be utilized to determine a device 110 configuration, and hence, an appropriate display format. For example, in some embodiments hardware switch 270 is coupled to a mechanical hinge and outputs a signal indicative of whether that hinge is open or closed. If the hinge corresponds to a component of device 110 (e.g., a keypad) that is opened when the device is used in a particular orientation, the open or closed state of the hinge can be used to infer device (and thus, display screen) orientation. As another example, a form factor associated with device 110 may partition device 110 into operative layers. Screen 236 may be coupled to a slider mechanism that permits movement of display screen 236 relative to other portions of device 110. (One example of a device with a display screen coupled to a slider mechanism is the N95 mobile communication device available from Nokia Corporation.) In one configuration, the slider mechanism (and display screen) is extended so as to expose keys, buttons or other controls. In another configuration, the slider mechanism and display screen cover those keys, buttons and/or other controls). Because the slider configuration exposing the controls is associated with use of the device in a portrait orientation, output from a switch 270 coupled to the slider can be used to infer orientation of the device and display screen relative to the user.

Alternative mechanisms may be implemented to determine an appropriate display format. For example, device 110 may be fabricated with a push-button, a key, or the like to toggle between one type of display format (e.g., HSG) and another (e.g., VSG). Alternatively, or additionally, one or more menus may be used to select the type of display format.

Figure 3A:
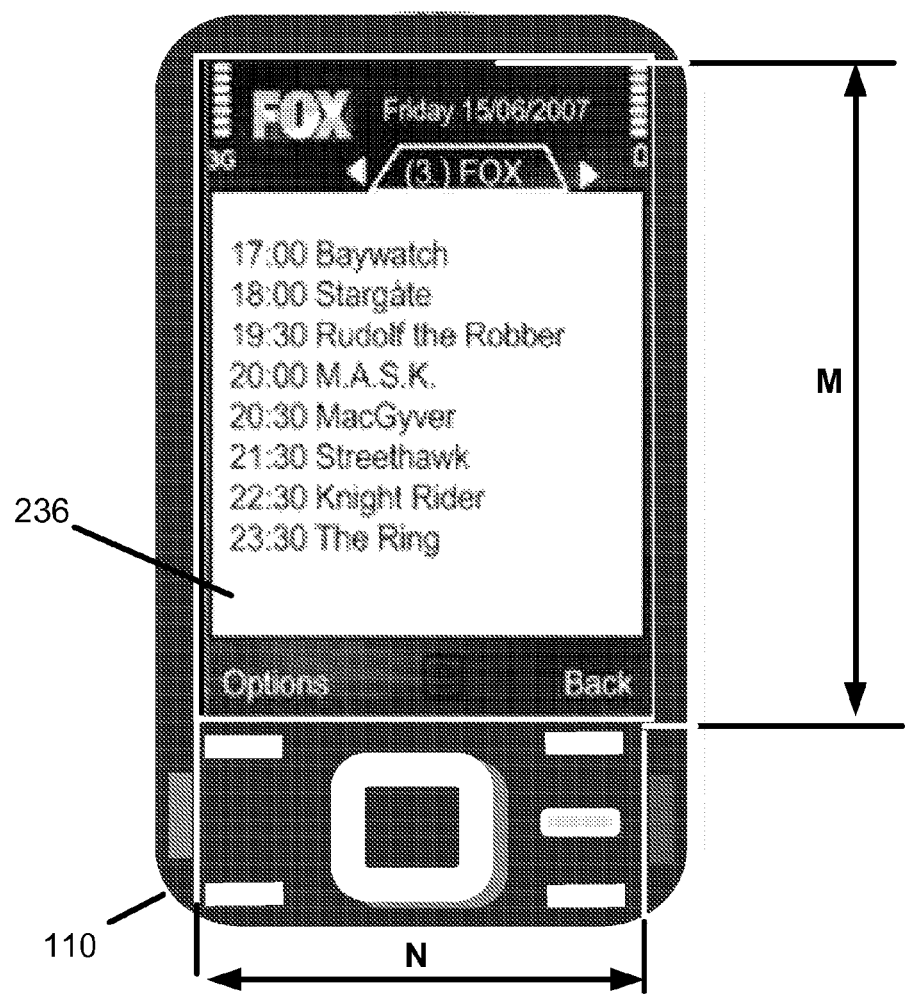
FIG. 3A illustrates a VSG screen shot in a device according to some embodiments.

Device 110 is configured to automatically change the format of information in display screen 236 upon detecting a change in orientation of device 110 in some embodiments. In FIG. 3A, describing one embodiment, device 110 is in a portrait orientation and showing a VSG. In the example of FIG. 3A, the VSG provides information about programming on a FOX network channel (channel 3). The VSG of FIG. 3A can also be considered an R×S array in which R corresponds to the number of columns and S corresponds to the number of rows. In FIG. 3A, R=2 (columns for time and for program titles) and S>2 (with multiple rows corresponding to a specific program/time pair).

Figure 3B:
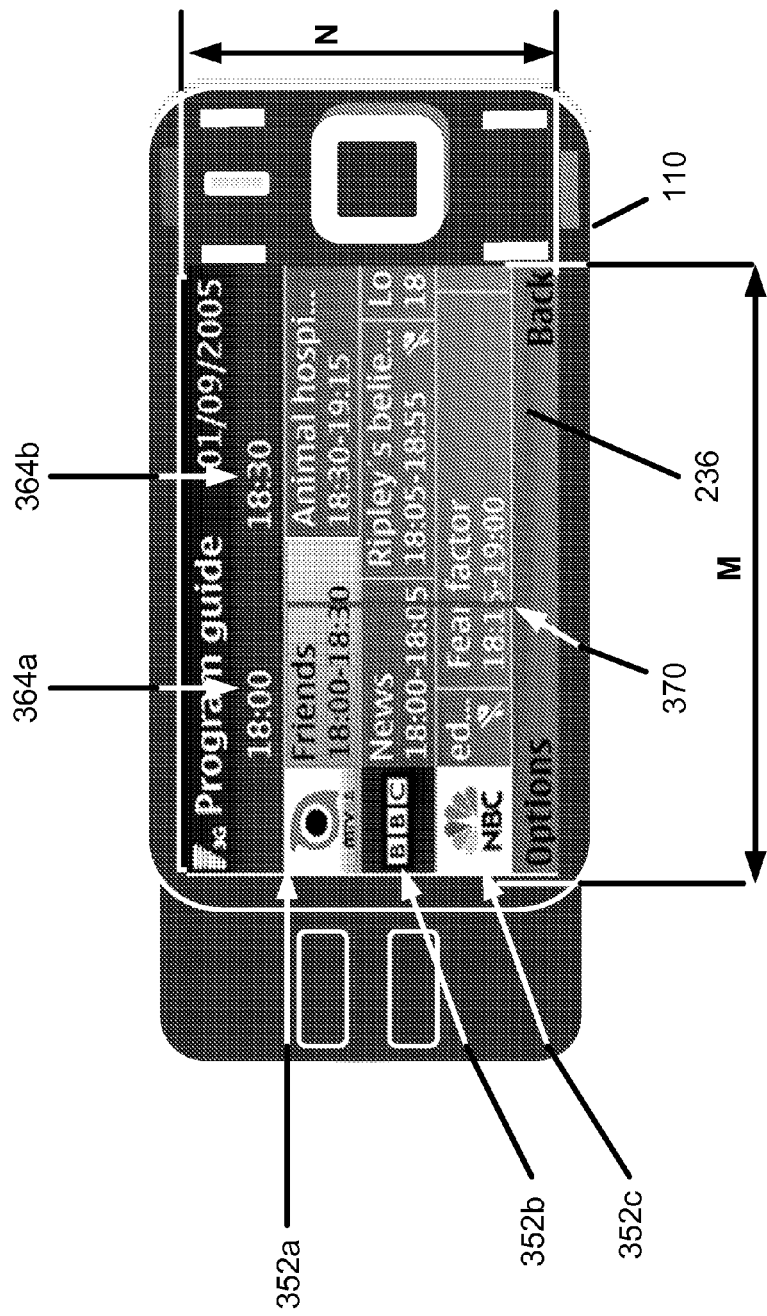
FIG. 3B illustrates an HSG screen shot in a device according to some embodiments.

In FIG. 3B, describing one embodiment, device 110 is in a landscape orientation and showing an HSG. In the example of FIG. 3B, the HSG provides information related to a number of broadcast channels and their corresponding channel icons 352 (e.g., 352a-c), programs (not labeled), program icons (not shown), program start times 364 (e.g., 364a-b), and a current time indicator 370. The HSG of FIG. 3B can also be considered a U×V array in which U corresponds to the number of columns and V corresponds to the number of rows. In FIG. 3B, U=3, as there is a column for channels and their corresponding channel icons (MTV3 352a, BBC 352b and NBC 352c) and two columns for times (18:00 (364a) and 18:30 (364b)). As also shown in FIG. 3B, V=4 (with the top row providing times and each of the other rows showing programs on a specific channel in a particular time range).

Although the embodiment of FIGS. 2-3 has been described using electronic service guides as an example, other embodiments change information format (based on device orientation) to display other types of information. For example, a format corresponding to a portrait orientation may have an R'×S' array and a format corresponding to a landscape orientation may have an U'×V' array, where S'>V' and/or R'<U'. In still other embodiments, either (or both) of the landscape and portrait formats may not be an array, but the formats are nonetheless configured to take advantage of their corresponding display orientations, and the difference(s) between the landscape and portrait formats is more than a mere rotation and/or scaling of the entire displayed image as a whole. For example, each of a given set of information objects to be displayed (e.g., cells in a table, pictures, text blocks, banners, etc.) may have a defined shape, but the objects may be arranged relative to one another in numerous ways without affecting the underlying purpose of the information. In such a case, the locations of the information objects relative to one another can be rearranged based on device orientation so as to maximize use of available display screen area.

Figure 4:
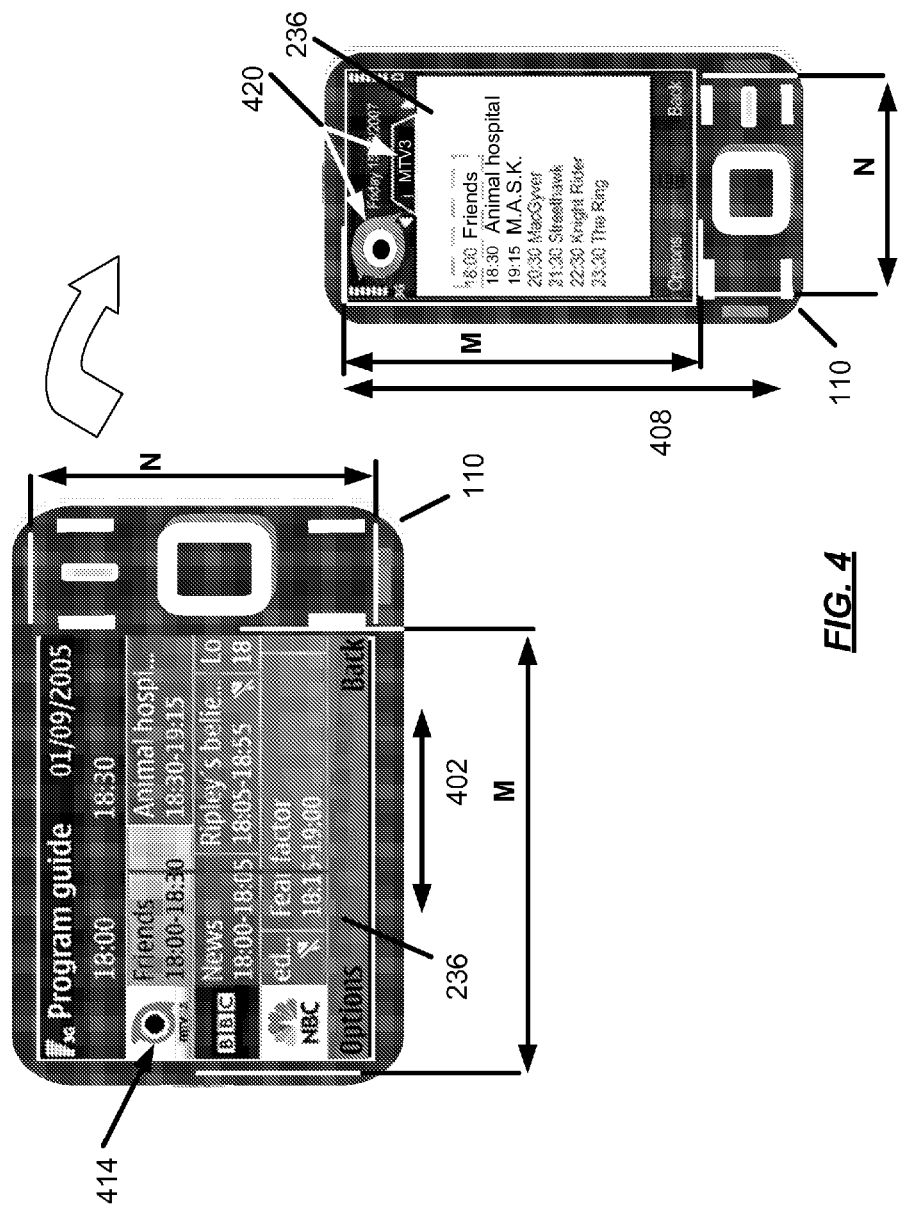
FIG. 4 shows transformation from an HSG display to a VSG display based on change in device orientation.

FIG. 4, describing one embodiment, shows transformation from an HSG display format (when device 110 is in a landscape orientation 402) to a VSG display format (when the device is in a portrait orientation 408). Responsive to the change in orientation, device 110 automatically changes its display format from an HSG to a VSG (or vice versa, where the change in orientation is from portrait orientation to landscape orientation). As shown, the program "Friends" aired on channel MTV3 is initially in focus (e.g., highlighted) in the HSG while device 110 is in landscape orientation 402. Once the user rotates device 110 so as to be in portrait orientation 408, the VSG display format associated with portrait orientation retains at least some of the characteristics of the item selected in the HSG. For example, "Friends" and its accompanying start time of 18:00 is shown with a dashed box display pattern around it to indicate that it is in focus in the VSG display format, i.e., the focus stays on the same program between the HSG and the VSG, and vice versa. Alternatively, or additionally, other indicators may be used to indicate focus or a status of which program is active. For example, highlighting, shading, other display patterns and the like may be used. Sounds may also be included to provide an indication of focus or active program status. For example, a short audio clip from an episode of "Friends" may be played responsive to a change in display format or a change of program focus. Furthermore, the MTV3 name and cyclone logo 414 associated with landscape orientation 402 may be replicated as element(s) 420 when device 110 is situated in portrait orientation 408. In one or more of these manners, context may be retained when switching from one display format (e.g., HSG) to another (e.g., VSG), such that a user is not required to reorient herself upon being presented with the updated display format. In some embodiments, additional motions (e.g., rotation, turning, etc.) may also cause a change in display format from an HSG to a VSG and vice versa.

In some embodiments, hysteresis (or a hysteresis window) is implemented to ensure that device 110 does not repeatedly or excessively alternate between an HSG and a VSG display format, and between the command in general, when device 110 is held in a position approximately equal to a logical threshold point for switching. The hysteresis may be based on a time parameter (e.g., a restriction may be imposed to prohibit switching from an HSG display format to a VSG display format and back to an HSG display format within three seconds). Alternatively, or additionally, the hysteresis may be conditioned on a degree of motion, such as a degree of rotation (e.g., five degrees of rotational change is sensed before switching from an HSG display format to a VSG display format), degree of acceleration and/or speed of rotation and/or movement. The degree of rotation parameter (e.g., five degrees) may be fixed, or may be modified on a user-by-user basis (e.g., in conjunction with a user profile) to accommodate individual preferences (or a particular individual that happens to have unsteady hands).

Figure 5:
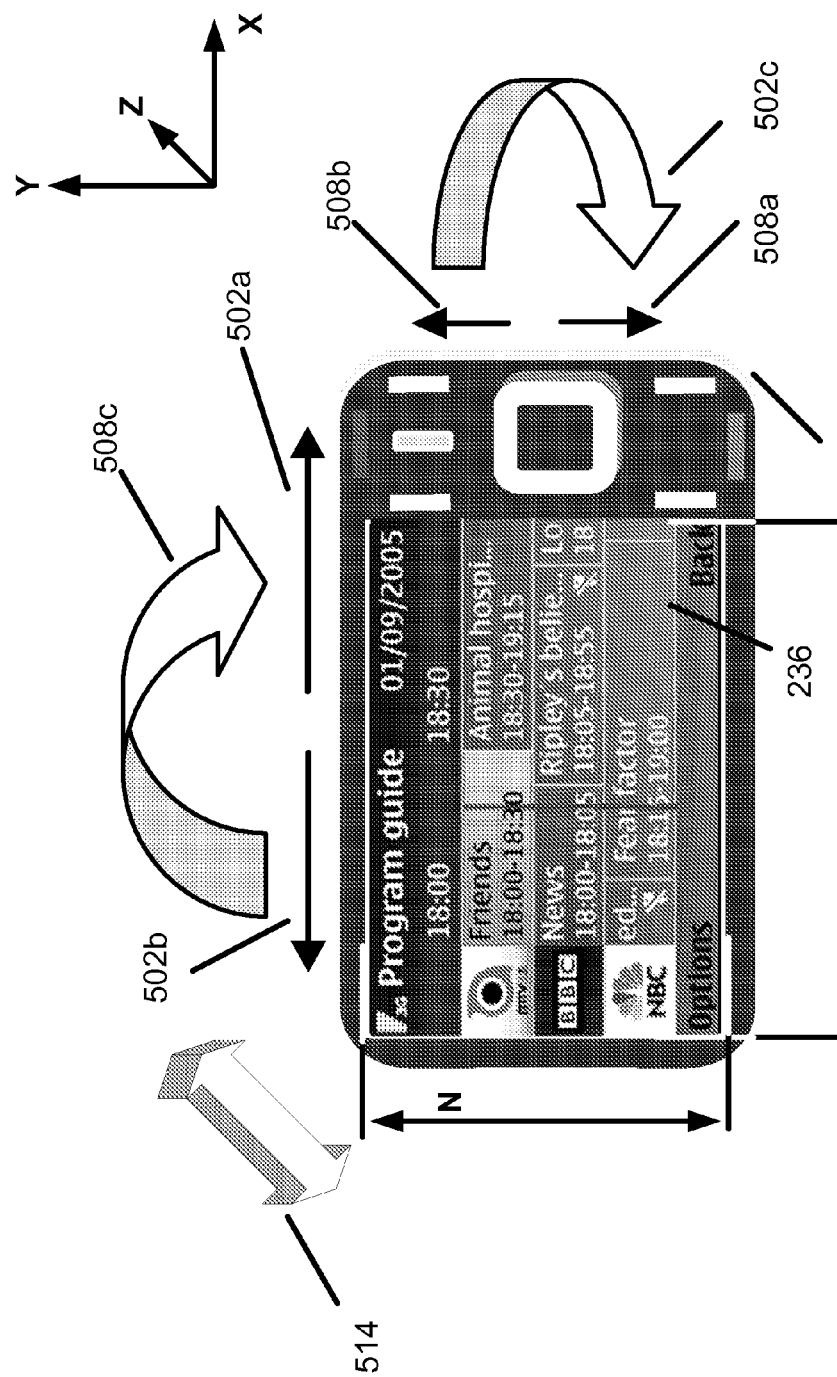
FIG. 5 shows manipulation of a device display based on user movement of the device.

In some embodiments, and as shown in FIG. 5, a user may utilize other kinds of device motions to affect the information displayed on a display screen (e.g., display screen 236). For example, a user may displace device 110 in a horizontal (x-axis) direction 502 that is generally parallel to a plane in which screen 236 lies. Responsive to rightward displacement 502a, the HSG may be updated by cycling forward with respect to time; thus, the display screen may be updated to show times starting with 19:00 (not shown). In effect, moving device 110 to the right causes HSG information to move to the left inside of display screen 236. Responsive to leftward displacement 502b, the HSG may be updated by cycling backward with respect to time; thus, the display screen may be updated to show times starting with 17:00 (not shown). In effect, moving device 110 to the left causes HSG information to move to the right inside of display screen 236. Rotation characterized by 502c (about a y-axis as shown, which is generally parallel to a plane in which screen 236 lies) may be used to rapidly cycle forward or backward with respect to time. The amount of advancement may be based on an angular acceleration associated with rotation 502c (e.g., advance one hour for every 0.7 rad/s$^2$). Alternatively, or additionally, the amount of advancement may be based on a time duration that a rotated position is maintained (e.g., advance one hour for every three seconds that device 110 is held in a rotated position characterized by motion 502c).

A user may also displace device 110 in a vertical (y-axis) direction 508. Responsive to downward displacement 508a, the HSG may be updated by incrementing the channel numbers, and the corresponding programs that accompany such channel numbers, that are displayed (i.e., scrolling the HSG downward in display screen 236). Responsive to upward displacement 508b, the HSG may be updated by decrementing the channel numbers, and the corresponding programs that accompany such channel numbers, that are displayed (i.e., scrolling the HSG upward in display screen 236). In other embodiments, movement of device 110 in directions 508a and 508b can be used to scroll on the time axis (in a manner similar to that described in connection with movement directions 502a and 502b). Rotation characterized by 508c (about a x-axis as shown) may be used to rapidly cycle forward or backward with respect to channel numbers. The amount of advancement may be based on an angular acceleration associated with rotation 508c (e.g., advance ten channels for every 0.7 rad/s$^2$). Alternatively, or additionally, the amount of advancement may be based on a time duration that a rotated position is maintained (e.g., advance ten channels for every three seconds that device 110 is held in a rotated position characterized by motion 508c).

A user may also displace device 110 in a forward or backward direction (e.g., towards or away from the user, respectively) along a z-axis as shown (perpendicular to a plane of display screen 236) as characterized by motion 514. In some embodiments, sensors in device 110 may determine a velocity, acceleration, direction, rotation or the like associated with motion 514. Responsive to the user moving device 110 away from herself, HSG may be updated to zoom out. Zooming out may entail updating the HSG to display more channels, but with less program details, or to use a smaller size font. Responsive to the user moving device 110 toward herself, HSG may be updated to zoom in. Zooming in may entail updating the HSG to display fewer channels, but also displaying a greater amount of information with respect to each program. Metrics similar to those described above with respect to elements 502 and 508 may be implemented with respect to the degree of update to the HSG display responsive to a zoom-in or zoom-out operation associated with motion 514. For example, the speed of displacement associated with motion 514 may dictate the change in the number of channels displayed in the HSG. Similar types of display format modifications may take place in the context of device 110 oriented in a portrait orientation, wherein a VSG display format may be used. For example, as it relates to FIG. 3A, when a user moves device 110 away from herself (e.g., a zoom out operation), additional programs and program start times may be shown. Conversely, if the user moves device 110 toward herself (e.g., a zoom in operation), fewer programs and program start times may be shown (with arguably finer resolution allocated per program displayed, additional information such as icons being shown, and the like).

The parameters associated with the motion described above with respect to FIG. 5 are merely illustrative. In some embodiments, other motions, measurements, measurement parameters, and accompanying display updates are included. Furthermore, a user may have the ability to configure or customize (via a menu, program, or the like) how device 110 interprets a given motion.

Instead of sensing motion to modify or update the HSG display as shown in FIG. 5, touch screen gestures may also be accepted. For example, a user may slide a pen, stylus, or her finger on an HSG display, and the HSG display may pan responsive thereto.

The embodiment described above in conjunction with FIG. 5 has largely referred to an HSG and a VSG display on a device 110. One of skill in the art will appreciate that the concepts may be extended to other types of displays.

Figure 6:
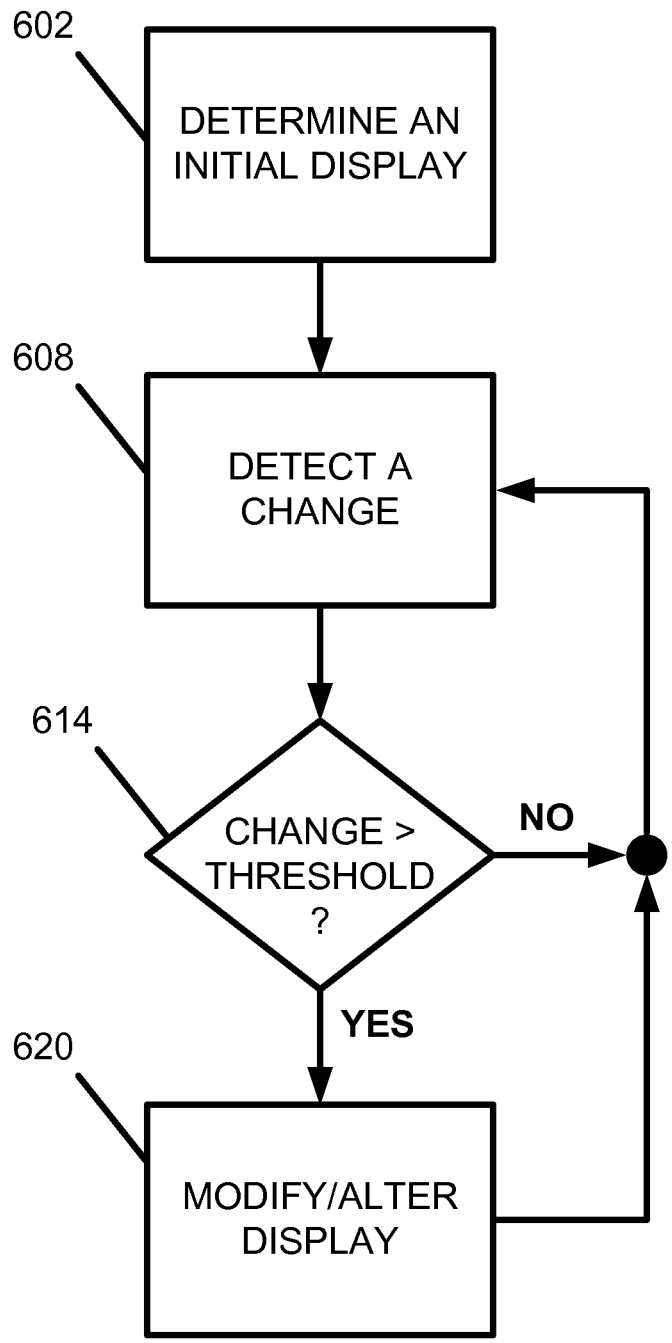
FIG. 6 is a flow chart showing an algorithm according to at least some embodiments.

FIG. 6 is a flow chart showing an algorithm carried out by device 110 in some embodiments. In step 602 an initial display format is determined. For example, in the context of the preceding description regarding HSG and VSG displays, an initial orientation of device 110 may be determined to choose between an HSG and a VSG display. Alternatively, or additionally, device 110 may provide for a log-in mechanism, and once a user logs-in, device 110 may determine whether to display an HSG or a VSG in accordance with user preferences (optionally contained in one or more user profiles). Thereafter, as shown via step 608, one or more sensors are enabled to determine if a change with respect to a motion associated with a device 110 has taken place. In step 614 device 110 determines if the change detected in step 608 is of a sufficient degree to justify updating the display. One of skill in the art will appreciate that steps 608 and 614 may be combined into a single step, and that at least one of steps 608 and 614 may include one or more filtering mechanisms, algorithms or the like. If the change is determined to be of a sufficient degree in step 614 (e.g., "Yes"), then a change to the display is made in step 620, at which point control is returned back to step 608 to continue sensing motion associated with device 110. In the context of HSG and VSG based displays, execution of step 620 may result in a toggling of the display type; the principle of operation, however, may be extended to encompass any number of display types where one display type is better suited for a first orientation, and where an additional display type is better suited for an additional orientation. If the change in step 614 is determined not to be of a sufficient degree (e.g., "No"), control is returned back to step 608 to continue sensing motion associated with device 110.

One or more of the steps shown in FIG. 6 may be made optional in a given embodiment. For example, the test associated with step 614 to see if motion exceeds a threshold parameter may be eliminated such that any detected movement results in an updated display. Moreover, the motion sensors described in the context of step 608 may be replaced by a push-button, a key, or the like.

Although the subject matter has been described by reference to specific to structural features and/or methodological acts, it is to be understood that the subject matter defined in the appended claims is not necessarily limited to the specific features or acts described above. For example, the subject matter discussed herein has been based on television programming It will be appreciated that the inventive concepts may be extended to FM/AM radio, multimedia programming on the Internet, and the like. In some embodiments, local media files are browsed. Such embodiments may be used if, e.g., download, recording, display refreshing, and/or program reloading times are taken into consideration in presenting information. Moreover, information conveyed may include, in addition to ESG, EPG or IPG listings, program information, play lists, media, file, message, email directories, and map presentations.

Figure 7:
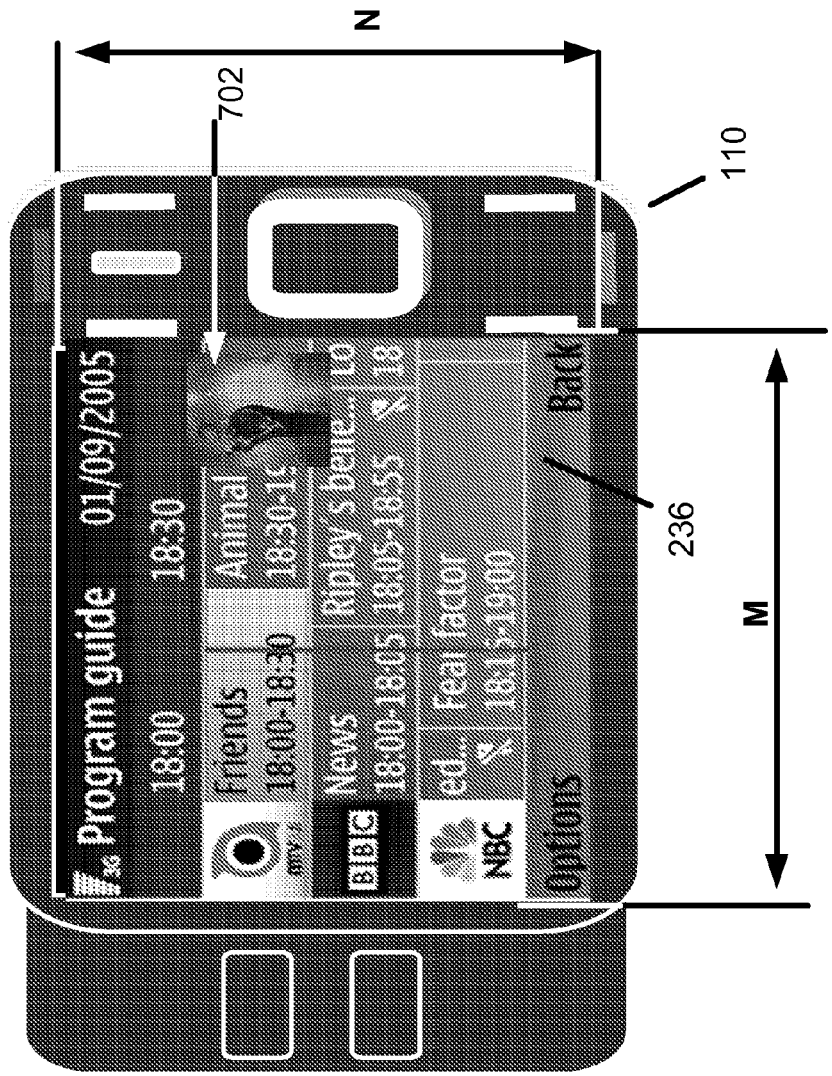
FIG. 7 is an HSG screen shot in a device according to some embodiments.

In some embodiments, device 110 includes location tracking equipment (e.g., global positioning system (GPS) equipment) to determine a current location of device 110 for purposes of updating times associated with programs, messages, emails and the like. In some embodiments, the movements and orientations described herein may be categorized into discrete windows of motion for purposes of updating a display screen. For example, a first orientation window may relate to rotating a device between 45 and 90 degrees from a previous orientation. Other orientation windows based on various movements are included in additional embodiments. Some embodiments take advantage of the display screen to overlay one layer of display information on top of another. For example, in relation to FIG. 7, a broadcast television program 702 may be displayed as being layered on top of a ESG program guide (shown in FIG. 7 as an HSG display format). Broadcast television program 702 may be based on a program selected from an HSG display format. If the device is subjected to a motion such that the display format is to change from an HSG to a VSG (e.g., in accordance with the description contained herein), the position of broadcast television program 702 on the display screen may be updated to accommodate the change in display format.

In some embodiments, device 110 includes hardware, software or firmware, or some combination thereof, that enables device 110 to communicate with a television, computer, or the like. For example, device 110 may be connected to a television (or to a computer or other device) using a TV-out cable, a universal serial bus (USB) cable, a BLUETOOTH connection, a wireless LAN (WLAN) connection, etc. When device 110 is connected to the TV or the computer, an ESG may be displayed on the television's or the computer's screen. Alternatively, the ESG may be displayed on both the television screen and device 110's display screen (e.g., display screen 236). Furthermore, in some embodiments, the ESG may be displayed on device 110's display screen while the television screen is used to display a full screen TV transmission. The program (or other content) associated with the full screen TV transmission may then be selected using an ESG on device 110. For example, a user of device 110 may select a program from an ESG (e.g., "Friends" as shown in FIG. 4), and that selection may cause the television to tune to an appropriate broadcast channel to show "Friends" on the television screen. As with previously described embodiments, the device 110 coupled to the TV may be rotated to change from an HSG to a VSG (or vice versa), may be translated and/or rotated to pan, zoom, and/or scroll, may be used to show information other than a VSG or HSG, etc. In one embodiment, the TV or the computer may receive the television/radio broadcasting via its own television/radio broadcasting receiver; the user device 110 controls the channel/program changes in the TV or the computer with the ESG that is received and stored in the user device 110, and only commands are sent to the TV or the computer.

In still other embodiments, a device may have two display screens. One of the display screens is visible when the device is in a first configuration, and the other is not visible until the device is in a second configuration. For example, the device may have a hinged cover with one of the display screens on the outside of the cover and with a second (and perhaps larger) display screen on the inside of the cover. The device may have controls and other features on the outside such that the outside display screen is likely to be in a portrait orientation relative to the user when the cover is closed. When the cover is open, the inside display screen may likely be in a landscape orientation relative to the user. Accordingly, a signal from a hardware switch coupled to the hinge can be used to cause the display of information in a first format (e.g., a VSG) on the outside display screen when the cover is closed and to cause the display of information in a second format (e.g., an HSG) on the inside screen when the cover is open.

Numerous characteristics, advantages and embodiments have been described above with reference to the accompanying drawings. However, the above description and drawings are illustrative only. The invention is not limited to the illustrated embodiments, and all embodiments of the invention need not necessarily achieve all of the advantages or purposes, or possess all characteristics, identified herein. Various changes and modifications may be effected by one skilled in the art without departing from the scope or spirit of the invention. Although example devices and components have been described, the invention is not limited to such devices or components unless specifically required by the language of a claim. The elements and uses of the above-described embodiments can be rearranged and combined in manners other than specifically described above, with any and all permutations within the scope of the invention.

What is claimed is:

1. A method comprising:
   determining that a display screen of a device is moved relative to a user, from a first position or orientation to a second position or orientation that is different from the first position or orientation; and
   switching from a presentation of one or more information objects of a first information display format of an application state to a presentation of one or more information objects of a second information display format of the application state on the display screen in response to the determination,
   wherein at least some of the one or more information objects of the second information display format provide further information regarding at least some of the one or more information objects in the first information display format.

2. A method of claim 1, wherein the application state is associated with a program listing, a program guide, a media stream, a media broadcast, a play list, a media directory, a file directory, a message directory, an email directory, a set of files, a set of map presentations, or a combination thereof.

3. A method of claim 1, further comprising:
   causing, at least in part, activation of a content program or file associated with the one or more information objects of the first information display format as a list; and
   causing, at least in part, presentation of the one or more information objects of the second information display format in one or more table cells on the display screen.

4. A method of claim 1, further comprising:
   causing, at least in part, activation of a content program or file associated with the one or more information objects of the first information display format; and
   causing, at least in part, presentation of the content program or file as layered on top of the first information display format on the display screen.

5. A method of claim 4, further comprising:
   during or upon switching the presentations, causing, at least in part, updating to another content program or file associated with selected one or more information objects of the first information display format; and
   causing, at least in part, presentation of the other content program or file as layered on top of the second information display format on the display screen.

6. A method of claim 1, wherein the determination that the display screen is moved relative to the user is based, at least in part, on the display screen rotating relative to the user, the device rotating relative to the user, the display screen rotating relative to at least one other component of the device, the display screen displacing in one direction relative to the user, the device displacing in one direction relative to the user, the display screen displacing in one direction relative to at least one other component of the device, or a combination thereof.

7. A method of claim 6, further comprising:
   determining that one or more thresholds are reached based, at least in part, on a time duration of rotation, a time duration of the rotation is maintained, a time duration of displacement, a time duration of the displacement is maintained, a degree of the rotation, a degree of the displacement, a degree of acceleration of the rotation, a degree of acceleration of the displacement, or a combination thereof,
   wherein the first information display format is switched into the second information display format based, at least in part, on the determination that the one or more thresholds are reached.

8. A method of claim 7, wherein the first information display format is switched into the second information display format by scrolling the one or more information objects of the first information display format on the display screen, or by zooming the one or more information objects of the first information display format on the display screen, or a combination thereof.

9. A method of claim 1, wherein the one or more information objects of the first information display format are arranged in a different manner from the one or more information objects of the second information display format to maximize use of available area of the display screen, without affecting a purpose of the application state.

10. The method of claim 1, wherein,
    causing, at least in part, the presentation of the one or more information objects of the first information display format on the display screen includes presenting an electronic service guide (ESG) in a vertical service guide format, and
    causing, at least in part, the presentation of the one or more information objects of the second information display format on the display screen includes presenting the ESG in a horizontal service guide format.

11. An apparatus comprising:
    at least one processor; and
    at least one memory including computer program code for one or more programs,
    the at least one memory and the computer program code configured to, with the at least one processor, cause the apparatus to perform at least the following,
      determine that a display screen of a device is moved relative to a user, from a first position or orientation to a second position or orientation that is different from the first position or orientation; and
      switch from a presentation of one or more information objects of a first information display format of an application state to a presentation of one or more information objects of a second information display format of the application state on the display screen in response to the determination,
      wherein at least some of the one or more information objects of the second information display format provide further information regarding at least some of the one or more information objects in the first information display format.

12. An apparatus of claim 11, wherein the application state is associated with a program listing, a program guide, a media stream, a media broadcast, a play list, a media directory, a file directory, a message directory, an email directory, a set of files, a set of map presentations, or a combination thereof.

13. An apparatus of claim 11, wherein the apparatus is further caused to:
cause, at least in part, activation of a content program or file associated with the one or more information objects of the first information display format as a list; and
cause, at least in part, presentation of the one or more information objects of the second information display format in one or more table cells on the display screen.

14. An apparatus of claim 11, wherein the apparatus is further caused to:
cause, at least in part, activation of a content program or file associated with the one or more information objects of the first information display format; and
cause, at least in part, presentation of the content program or file as layered on top of the first information display format on the display screen.

15. An apparatus of claim 14, wherein the apparatus is further caused to:
during or upon switching the presentations, cause, at least in part, updating to another content program or file associated with selected one or more information objects of the first information display format; and
cause, at least in part, presentation of the other content program or file as layered on top of the second information display format on the display screen.

16. An apparatus of claim 11, wherein the determination that the display screen is moved relative to the user is based, at least in part, on the display screen rotating relative to the user, the device rotating relative to the user, the display screen rotating relative to at least one other component of the device, the display screen displacing in one direction relative to the user, the device displacing in one direction relative to the user, the display screen displacing in one direction relative to at least one other component of the device, or a combination thereof.

17. A method of claim 16, further comprising:
determine that one or more thresholds are reached based, at least in part, on a time duration of rotation, a time duration of the rotation is maintained, a time duration of displacement, a time duration of the displacement is maintained, a degree of the rotation, a degree of the displacement, a degree of acceleration of the rotation, a degree of acceleration of the displacement, or a combination thereof,
wherein the first information display format is switched into the second information display format based, at least in part, on the determination that the one or more thresholds are reached.

18. A non-transitory computer-readable storage medium carrying one or more sequences of one or more instructions which, when executed by one or more processors, cause an apparatus to at least perform the following steps:
determining that a display screen of a device is moved relative to a user, from a first position or orientation to a second position or orientation that is different from the first position or orientation; and
switching from a presentation of one or more information objects of a first information display format of an application state to a presentation of one or more information objects of a second information display format of the application state on the display screen in response to the determination,
wherein at least some of the one or more information objects of the second information display format provide further information regarding at least some of the one or more information objects in the first information display format.

19. A non-transitory computer-readable storage medium of claim 18, wherein the application state is associated with a program listing, a program guide, a media stream, a media broadcast, a play list, a media directory, a file directory, a message directory, an email directory, a set of files, a set of map presentations, or a combination thereof.

20. A non-transitory computer-readable storage medium of claim 18, wherein the apparatus is caused to further perform:
causing, at least in part, activation of a content program or file associated with the one or more information objects of the first information display format as a list; and
causing, at least in part, presentation of the one or more information objects of the second information display format in one or more table cells on the display screen.

* * * * *